United States Patent
Mikan

(10) Patent No.: US 6,329,647 B1
(45) Date of Patent: Dec. 11, 2001

(54) COMPENSATION REFERENCE CIRCUIT FOR OPTO-MECHANICAL JOYSTICK

(76) Inventor: Peter J. Mikan, 31 Greenfield Rd., Milford, CT (US) 06460

( * ) Notice: Subject to any disclaimer, the term of this patent is extended or adjusted under 35 U.S.C. 154(b) by 28 days.

(21) Appl. No.: 09/609,680

(22) Filed: Jul. 3, 2000

(51) Int. Cl.[7] ............... G01D 5/34; G01J 1/36; G06F 3/033
(52) U.S. Cl. ............ 250/221; 250/205; 250/214 C; 250/227.11; 250/227.22; 345/161
(58) Field of Search ............... 250/221, 222.1, 250/205, 208.2, 214 C, 214 R, 227.11, 227.21, 227.22, 227.28, 227.3; 345/156, 157, 158, 161; 356/152.2

(56) References Cited

U.S. PATENT DOCUMENTS

| | | | |
|---|---|---|---|
| 4,250,488 | 2/1981 | Haupt | 340/146.3 |
| 4,459,022 | * 7/1984 | Morey | 356/152.2 |
| 4,686,361 | * 8/1987 | Bard | 250/221 |
| 4,731,530 | * 3/1988 | Mikan | 250/229 |
| 5,225,831 | 7/1993 | Osborn | 341/20 |
| 5,558,329 | 9/1996 | Liu | 273/148 B |
| 5,621,207 | 4/1997 | O'Mara | 250/221 |
| 5,884,125 | 3/1999 | Taniguchi et al. | 399/128 |
| 6,130,424 | * 10/2000 | Mikan | 250/227.22 |
| 6,222,179 | * 4/2001 | Mikan | 250/221 |
| 6,246,047 | * 6/2001 | Mikan | 250/221 |

* cited by examiner

Primary Examiner—John R. Lee
(74) Attorney, Agent, or Firm—Our Pal Asija

(57) ABSTRACT

A fiber optic control device having a joystick lever in a housing which mounts the joystick lever for universal pivotal movement on the housing from an upright axis thereof. A pair of mirrors are movably mounted on the housing, driving connections between the joystick lever and the mirrors for actuating the latter in response to movement of the joystick. An electronic compensation reference circuit to compensate for variations in incident and reflected light due to temperature, aging, wear and tear, dirt grease etc is provided for each axis of the double axis joystick of this invention.

20 Claims, 2 Drawing Sheets

COMPENSATION REFERENCE CIRCUIT FOR OPTO-MECHANICAL JOYSTICK

RELATED APPLICATION

Figure 2:
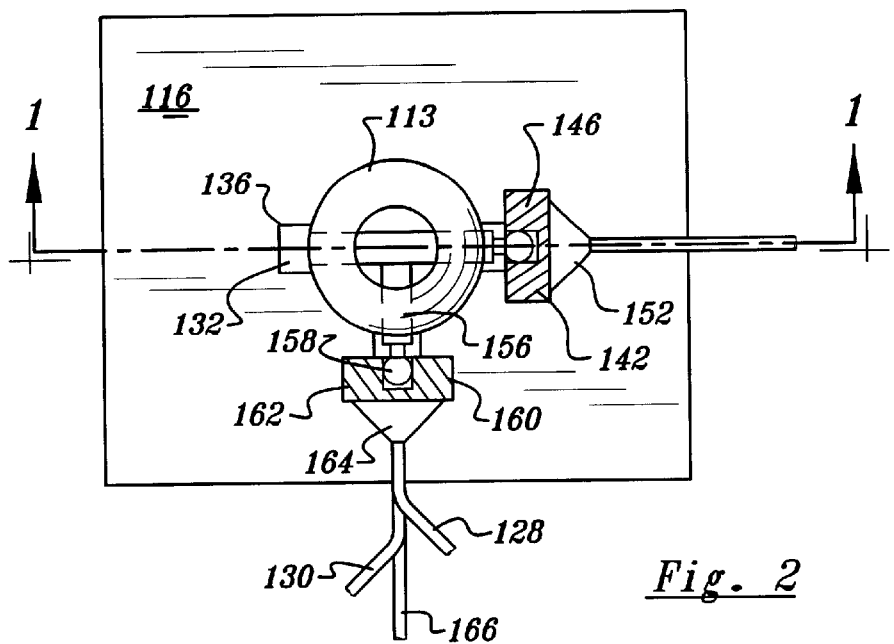

This application is tangentially related to U.S. Utility application Ser. No. 09/309,437 filed May 11, 1999 by the same inventor titled, "Fibre Optic Control with Positive Mechanical Drive from Joy Stick" now U.S. Pat. No. 6,130,424 which in turn is tangentially related to U.S. Utility application Ser. No. 09/251,780 filed Feb. 17, 1999 entitled, Fibre Optic Control with Joy Stick" also by the same inventor, now U.S. Pat. No. 6,246,047.

BACKGROUND

This invention relates generally to improved methods, devices and system for fibre optic control in joysticks for controlling the operation of various types of electronic or electromechanical equipment. More particularly it relates to an electronic compensation reference circuit for fiber optic joystick controller.

PRIOR ART

The problem with opto-mechanical justice controllers such as U.S. Pat. Nos. 4,459,022, 4,686,361 and 4,731,530 is that due to aging, wear and tear and dirt etc the magnitude of incident and reflected light varies and is not a faithful measure of the position of the joystick. An electronic compensation reference circuit of this invention eliminates this problem.

Unfortunately prior art devices singly or even in combination do not provide all of the features and objectives established by the inventor for this system as enumerated below.

OBJECTIVES

1. It is an objective of this invention to provide method, devices and system for fibre optic control in joysticks for controlling the operation of various types of electronic or electromechanical equipment.
2. Another objective of this invention is to provide a circuit which automatically compensates for variations in incident and reflected light due to again, wear and tear, dirt and grease on mirrors, changes due to ambient temperature of the environment or vibrations etc.
3. Another objective of this invention is to provide a compensation reference circuit which makes the joystick immune to electromagnetic radiation or other interferences.
4. Another objective of the circuit of this invention is to regulate the light source for each axis of the optical joystick.
5. Another objective of the circuit of this invention is to process the corresponding light that is reflected back by the joystick mirror
6. Another objective of the invention is to provide a novel and improved fiber-optic joystick control having relatively few components which can be economically fabricated and assembled so as to produce a very low cost control unit.
7. Another objective of the invention is to provide an improved fiber optic control device of the type above set forth, which is especially reliable and fool-proof in its operation.
8. Another objective of the invention is to provide an improved fiber optic/joystick control device as outlined above, which is especially small and compact, requiring but little space in addition to that required by prior art joystick.
9. Another objective of this invention is to provide positive mechanical drive or control from the joystick lever to the movable mirrors of the device.
10. Another objective of this invention is that it use little or no additional power or energy.
11. Another objective of this invention is that it is easy to use even intuitive that requires little additional training.
12. Another objective of this invention is that it be made of modular units easily interface-able to each other.
13. Another objective of this invention is that it meet all federal, state, local and other private standards, guidelines and recommendations with respect to safety, environment, quality and energy consumption.
14. Another objective of this invention is that it be elegantly simple in concept and design.
15. Another objective of this invention is that it be capable of mass production with easy of assembly, service, storage and transportation.
16. Another objective of this invention is that it be ergonomic, colorful and aesthetic.

Other objectives of this invention reside in its simplicity, elegance of design, ease of manufacture, service and use and even aesthetics as will become apparent from the following brief description of the drawings and concomitant description.

Figure 1:
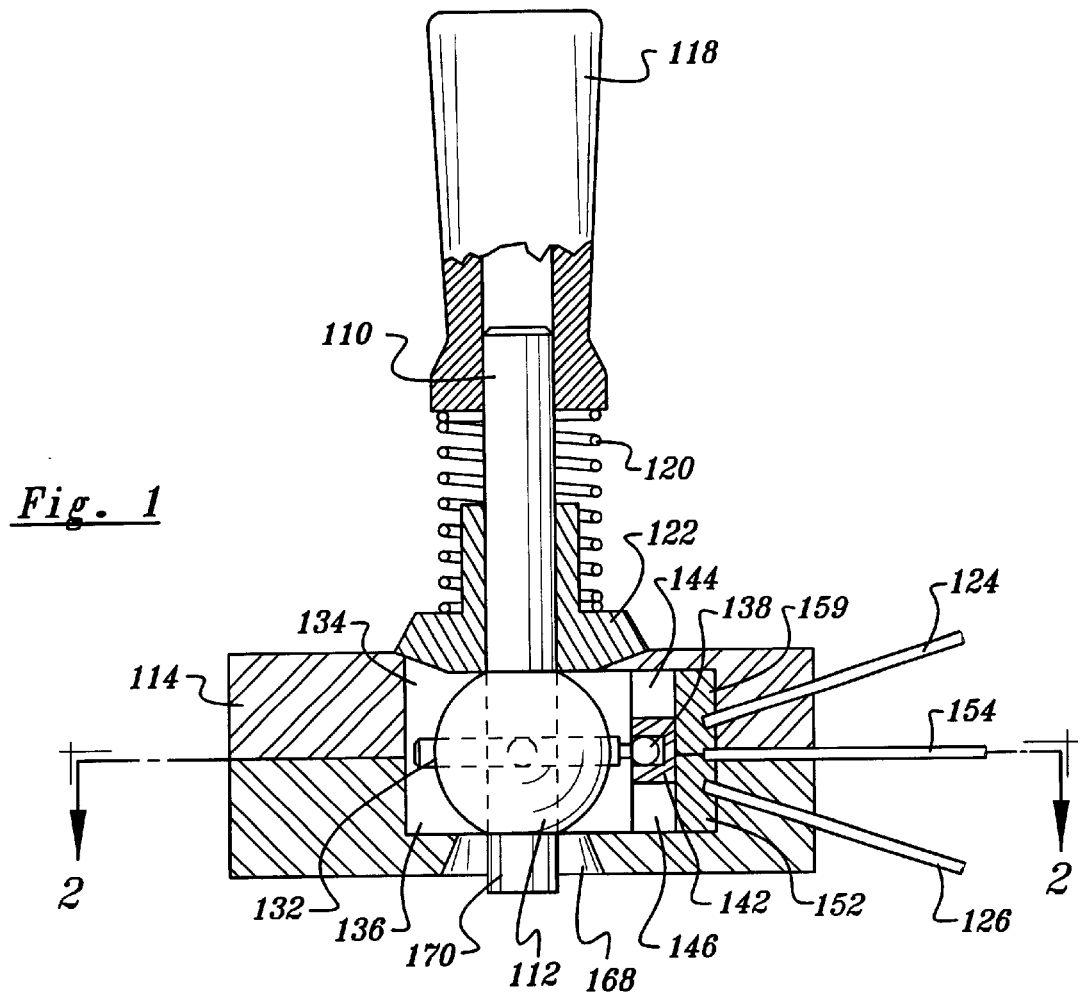
Figure 3:
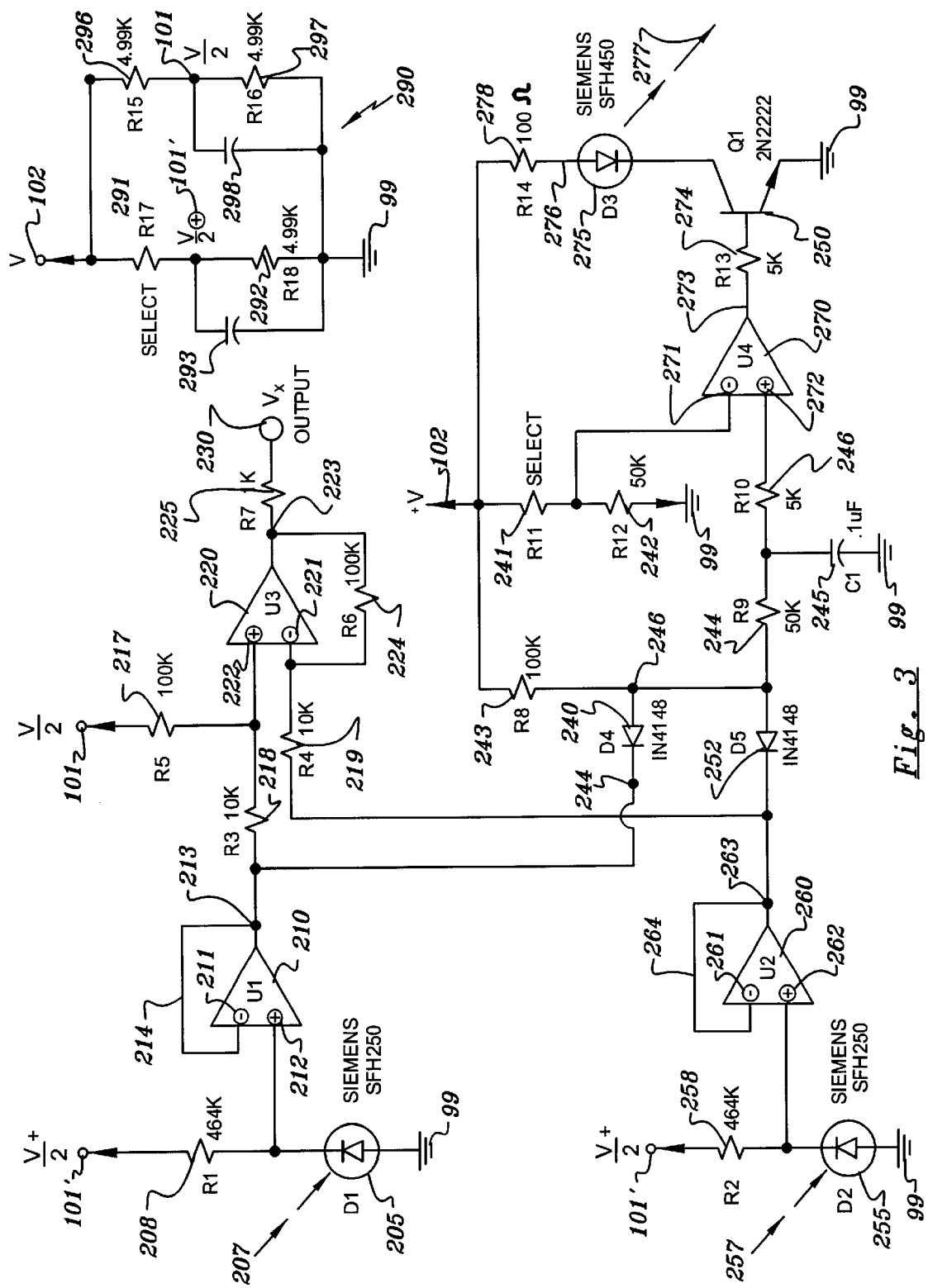

BRIEF DESCRIPTION OF THE DRAWINGS a) FIG. 1 is an axial sectional view of the improved fiber optic control of the invention, taken along the line 1—1 of FIG. 2.

b) FIG. 2 is a horizontal sectional view of the control, taken along the line 2—2 of FIG. 1.

c) FIG. 3 is a detailed circuit diagram of the compensation reference circuit of this invention for x axis. An identical circuit is used for the Y axis.

DETAILED DESCRIPTION OF THE BEST MODE PREFERRED EMBODIMENT

The compensation reference circuit for opto-mechanical joystick of this invention as shown in the various drawings wherein like numerals represent like parts throughout the several views, there is generally disclosed in FIG. 1 an axial sectional view of the improved fiber optic control of the invention, taken along the line 1—1 of FIG. 2 which in turn is a horizontal sectional view of the control, taken along the line 2—2 of FIG. 1.

The improved fiber optic control of the invention comprises a joy stick 110 having adjacent its lower end a swivel ball which is carried in a socket provided by upper and lower superimposed housing members 114 and 116 respectively. The joy stick 110 has an operating handle or knob 118 under which there is a centralizing spring 120 engaging a slidable collar 122 that rests in a conical depression of the upper housing member 114 to normally keep the joystick 10 in an upright position as shown in FIG. 1.

Tilted positions of the joystick 110 are utilized to provide fiber optic or light signals in sets of optical cables that are brought in to the housing 114, 116. Considering specifically optical signals in cables 124 and 126 which extend from the right side of the housing 114, 116 as seen in FIGS. 1 and 2, and also in optical cables 128 and 130 which extend from the lower side of the housing 114, 116 as seen in FIG. 1.

OPERATION OF THE CIRCUIT

The circuit of FIG. 2 provides regulated light source for each axis of the optical joystick 110 of this invention as well as processes the corresponding light that is reflected back by the joystick mirror 142. The circuit converts the reflected light 207, 257 to proportional output voltage. The circuit shown is for the X-axis output mirror 142. The Y-axis circuit is an exact identical and duplicate and is thus not shown.

The circuit maintains the light output 277 of D3 275 constant while compensating for both temperature and aging induced changes in D1 205, D2 255 & D3 275 as well as for changes in the optical fiber or dulling of the mirror 142.

Light 277 is produced by Light emitting diode D3 275 the intensity of which is controlled by transistor Q1 250 regulating the current through D3. The light is directed into the optical fiber 154, which impinges on mirror 142 and is reflected back at the optical fibers 124, 126.

Fiber 124 directs its light onto photodiode D1 205 while fiber 126 directs its light onto D2 255. Both D1 (such as Siemens SFH250) 205 and D2 (such as Siemens SFH250) 255 are connected in photoconductive mode. The light impinging on D1 205 produces a current flow through R1 208 and D1 205 which produces a proportional voltage at the positive input 212 of operational amplifier U1 210.

Likewise the light impinging on D2 255 produces a proportional voltage at the positive input 262 of operational amplifier such as National Semiconductor LM660C U2 260. Both U1 210 and U2 260 are connected as unity gain (using feedback loops 214,264) amplifiers buffering the voltage at their respective positive inputs 212 and 262 respectively.

The voltage at the output 213 of U1 210 is inversely proportional to the light 207 impinging on D1 205 ,(the more current that flows through D1 205 the greater the voltage drop across R1 208). The voltage at the output 263 of U2 260 is likewise inversely proportional to the light 257 impinging on D2 255. The operational amplifier U3 (such as LM660C) 220 is configured as a differential amplifier with its input referenced to V/2 101 and a gain of ten set by the resistors R3 218, R4 219, R5 217 and R6 224. When the outputs 213, 263 of U1 210 & U2 260 are equal then the output 223 of U3 220 is equal to V/2 101. This voltage passes through R7 225 to the output 230 for the x-axis.

When the mirror 142 is moved up by the handle 118 of the joystick 110, the light 207 impinging on D1 205 remains constant (this is the maximum light that D1 205 can receive which also corresponds to the minimum voltage at the cathode of diode D1 205. Thus the voltage output 213 of U1 210 stays constant, while the light 257 impinging on D2 255 is reduced decreasing the voltage drop across R2 258 & increasing the voltage at positive input 262 of U2 260.

This in turn increases the voltage at the output 263 of U2 260. This produces a reduced voltage at the x axis output 230.

Likewise when the mirror 142 is moved down by the handle 118 then the light 257 impinging on D2 255 stays constant keeping the voltage at the output 263 of U2 260 constant, while the light 207 on D1 205 is reduced. This increases the voltage at the U1 210 output 213 producing an increase in the voltage at the output for the x-axis 230.

When the mirror is at its center position, the handle 118 is also at the center position for a displacement, the light 207, 257 impinging on D1 205 and D2 255 is equal (and is also equal to the maximum light either can receive) thus producing equal voltages at the and U1 210 and U2 260 outputs 213, 263 respectively. This holds the center voltage at V/2 101 at the x-axis output 230.

This value of V/2 101 is the value at the outputs 213, 263 of U1 210 & U2 260 respectively when the handle 118 is at the center or when the motion of the mirror produces no change on the corresponding photodiodes D1 205 or D2 255. This then is the minimum value possible at the outputs 213, 263 of U1 210 or U2 260, for as light 207, 257 impinging on either D1 205 or D2 255 decreases the corresponding outputs 213, 263 of U1 210 or U2 260 increases.

This minimum value is used in a feedback loop to control the light output 277 of D3 275 as described below. The diodes D4 240 and D5 252 have their cathodes connected to the outputs 213, 263 of U1 210 and U2 260 respectively. Thus passing the smaller of the two voltages through R9 244 & R10 246 to the positive input 272 of U4 270 The voltage is inversely proportional to the light output 277 of D3 275 and is compared to the voltage at the negative input 271 of U4 270, a reference set by resistors R11 241 & R12 242. The difference between this feedback voltage 272 and the reference 271 is amplified by U4 270 producing a change at the output 273 of U4 270. This changes the current through R13 274. Thus adjusting the current into the base of transistor Q1 250 and affecting the light output of D3 275.

Should the maximum light 207, 257 received by either D1 205 or D2 255 should decrease, the voltage at the positive input 272 of U4 270 increases relative to reference voltage at the negative input 271, thereby causing the current into the base of Q1 250 to increase thus restoring the light output 277 of D3 275 to its set value. Likewise, should the maximum light 207, 257 received by D1 205 or D2 255 increase from the original set value, the feedback loop through diodes D4 D5 (240,252) would decrease the voltage at the positive input 272 of U4 270, thus decreasing the voltage at output 273 of U4 270, which in turn decreases the current into the base of Q1 250. Thus decreasing the light output 277 of D3 275.

The voltage V/2 101 is set by the matched resistor divider R15 296 and R16 297. The voltage V/2+ 101' is set by R17 291 and selecting R18 292 such that this voltage 101' is slightly more positive than v/2 101 thus allowing for initial calibration of the voltages at D1 205 and D2 255.

The invention also provides simple means for preventing any turning movement of the joystick 110 about its axis, such means also constituting part of the structure by which the optical signals are produced in the cables 124 and 126. To effect this, a transverse pin or shaft 132 is disposed in the ball 112 along a horizontal diameter thereof, as seen in FIG. 1, one end of the pin 132 extending from the ball into a vertical guide formed by aligned slots 134 and 136 located respectively in the upper and lower halves 114 and 116 of the housing. Thus movement of the joystick 110 is restricted to a tilting movement only by the pin 132 and the socket 113 of the housing parts 114 and 116.

In accordance with the invention the tilting movements of the joystick are utilized to produce optical pulses or signals in the cables 124, 126, 128 and 130 in a unique manner by especially simple structures which not only have few and inexpensive components but which are particularly rugged and reliable in their operation.

As seen in FIGS. 1 and 2, the other end of the pin 132 projects from the opposite side of the ball 112 and carries a ball 138 which is received in a socket of a mirror member 142 which is vertically slidable in aligned slots 144 and 146 of the housing parts 114, 116. The member 142 has on its outer surface a reflecting bar or mirror which is exposed to recesses 159 and 152 that are formed in the housing halves 114 and 116.

As shown in FIG. 1, the optical cables 124 and 126 terminate at their ends in the recesses 159 and 152 respectively, whereby they can receive light that is reflected from the mirror.

To provide the necessary light to the mirror member 142, an optical cable 154 is provided, paired with the cables 124, 126 as seen in FIGS. 1 and 2. With the above arrangement, tilting either toward the left or toward the right of the joystick 110 results in either upward or else downward movement of the ball 138 and mirror member 142 to move either upward or downward in the slots 144 and 146. This results in differential light intensities being reflected from the mirror member 142 to the optical cables 124, 126, and such signals can be utilized by suitable known electronic equipment to operate equipment in either of opposite modes.

It should be noted that the drive from the ball 112 to the mirror 142 is of a positive mechanical nature, giving for reliable transformation of tilt movements of the joy stick to the controlled equipment. Such movement can be considered as being in either "x" or "−x" directions. The circuit of FIG. 3 is shown for x-axis with interface to the mirror member 142.

Referring now again to the drawings, a like arrangement is provided for "y" axis movements. Another circuit identical to FIG. 3 is also used for Y axis. The ball 112 can be provided with a second pin 156 on the end of which a ball 158 is provided, received in a suitable socket of a second slidably mounted mirror member 160 that is vertically movable in guide slots 162 of the housing 114, 116.

The mirror 160 also has a reflective surface similar to the mirror member 142. The optical signal cables 128 and 166 open into recess 164, together with a light-beam supplying cable 130 to provide an optical transformation of movements of the ball 158 along the "y" axis into light signals for the cables 128 and 166. The socket of the mirror member 160 is not a true cylinder but instead is slightly elongated horizontally as shown to take care of the particular geometry of the joystick and associated parts, since the ball 158 requires some sideways or horizontal movement due to the restraint placed on the joystick by the pin or shaft 132.

Here again, however, a sturdy positive drive is still established from the joystick 110 to the mirror member 160, providing for great reliability in the responses to movement of the joystick.

Also, in accordance with the invention, the lower housing member 116 is provided with a conical opening 168 to accommodate the lower tip 170 of the joystick, such arrangement constituting a positive stop for the various tilting,movements of the joy stick.

The pivot ball 112 can be formed of either plastic or metal. The mirror members can be constituted of either plastic or metal.

EASE OF USE

The use of electronic compensation reference circuit with the joystick is user transparent and therefore involves no further training on the part of the user.

The inventor has given a non-limiting description of this invention. Due to the simplicity and elegance of the design of this invention designing around it is very difficult if not impossible. Nonetheless many changes may be made to this design without deviating from the spirit of this invention. Examples of such contemplated variations include the following:
1. The shape and size of the various members and components may be modified.
2. The device may be adopted for single and even three axis joystick operation.
3. Additional complimentary and complementary functions and features may be added.
5. A different type of fibre optic cable or light carrier may be used.
6. Values and tolerance and other specifications of various components such as the resistors, capacitors, diodes, and operational amplifiers etc may be modified to suit the particular application.

Following is a listing of the components used in this embodiment arranged in ascending order of the reference numerals for ready reference of the reader.

099=Ground
101=V/2
101'=V/2+
102=V
110=Joystick lever
112=Pivot ball
113=Socket in housing
114=Upper housing half
116=Lower housing half
118=Joystick handle or knob
120=Compression spring
122=Slidable centralizing collar
124=Fiber optic output cable 1 for X axis
126=Fiber optic output cable 2 for X axis
128=Fiber optic output cable 1 for Y axis
130=Light providing fiber optic cable
132=Pin or shaft
134=Slot in upper housing half X axis
136=Slot in lower housing half X axis
138=Ball
140=Socket in mirror member
142=Mirror member
144=Slot in upper housing half Y axis
146=Slot in lower housing half Y axis
148=Mirror bar
150=Recess in upper housing half
152=Recess in lower housing half
154=Light-providing optical cable
156=Pin or shaft
158=Ball on pin 56
160=Second axis mirror member
161=Socket in second mirror member
162=Slot in lower housing half
164=Recess in lower housing half
166=Fiber optic output cable
168=Conical hole in lower housing half
170=Bottom extension of joy stick lever
205=Photoconductive diode D1 such as Siemens SFH250
207=Incident light on D1
208=Resistor 464 K Ohms
210=Op amp such as National LM660C
211=Negative input of op amp 210
212=Positive Input of op amp 210
213=Output of op amp 210
214=Feedback loop for op amp 210
217=100 K resistor
218=10 K resistor to positive input of op amp 220

219=10 K resistor to negative input of op amp 220
220=Op amp such as National LM660C
221=Negative input of op amp 220
222=Positive Input of op amp 220
223=Output of op amp 220
224=Feedback loop for op amp 220
225=1 K ohms resistor
230=Vx output
240=Diode such as 1N4148
241=Selected value resistor between V+ and negative input of op amp 270
242=50 K ohm resistor between ground and negative input of op amp 270
243=100 K ohm resistor
244=50 K ohm resistor
245=0.01 microfarad capacitor
246=5K resistor to positive input of op amp 270
250=Transistor such as 2N2222
252=Diode such as 1N4148
255=Photoconductive diode D2 such as Siemens SFH250
257=Incident light on D2
258=Resistor 464 K Ohms
260=Op amp such as National LM660C
261=Negative input of op amp 260
262=Positive Input of op amp 260
263=Output of op amp 260
264=Feedback loop for op amp 260
270=Op amp such as LM660C
271=Negative input of op amp 270
272=Positive input of op amp 270
273=Output of op amp 270
274=5K ohm resistor
275=Photo emitting diode such as Siemens SFH450
277=E Emitted light from 275
278=100 ohm resistor
290=Calibration circuit generally
291=4.99 K ohm resistor
292=4.99 K ohm resistor
293=Capacitor
296=4.99 K ohm resistor
297=4.99 K ohm resistor
298=Capacitor

DEFINITIONS AND ACRONYMS

A great care has been taken to use words with their conventional dictionary definitions. Following definitions are included here for clarification.

Integrated=Combination of two entities to act like one
Interface=Junction between two dissimilar entities
Joystick=A swivel mounted manually-engageable lever capable of movement from a center position to any one of a number of angular positions lying within a theoretical upwardly-extending conical surface, for controlling the operation of various types of electronic or electromechanical equipment.
Symmetrical=The shape of an object of integrated entity which can be divided into two along some axis through the object or the integrated entity such that the two halves form mirror image of each other.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description.

It is therefor contemplated that the appended claims cover any such modifications, embodiments as fall within the true scope of this invention.

The inventor claims:

1. An electronic compensation reference circuit for fiber optic electromechanical control device for providing a regulated light source and for processing the reflected light from joystick mirrors to compensate for changes due to temperature, aging and reflectivity of mirrors and fiber optic path comprising:
   a) means for generating a regulated light source;
   b) means for directing and dividing said regulated light source into two light components as a function of the joystick position along an axis;
   c) means for directing said two light components one each onto two photo diodes;
   d) means for converting said two light components into proportional electrical signals;
   e) means for amplifying said two electrical signals;
   f) means for reamplifying the difference between said two amplified electrical signals for use as joystick position along an axis; also
   g) means for comparing the smaller of said two amplified electrical signals to a reference signal; and
   h) means for utilizing the output of said comparison to regulate said regulated light source.

2. The electronic compensation reference circuit of claim 1 wherein a second identical circuit is employed for processing movement of the joystick along a second axis.

3. The electronic compensation reference circuit of claim 1 wherein said regulated light source includes signal for inverse proportional compensation due to temperature, aging, reflectivity of joystick mirror and fiber optic path.

4. The electronic compensation reference circuit of claim 1 wherein said regulated light source comprises a light emitting diode.

5. The electronic compensation reference circuit of claim 1 wherein said means for directing and dividing said regulated light source into said two light components as a function of the joystick position along an axis comprises a fibre optic path and a mirror.

6. The electronic compensation reference circuit of claim 1 wherein each of said two photo diodes in said means for directing said two light components one each onto two photo diodes are in photoconductive mode.

7. The electronic compensation reference circuit of claim 1 wherein said means for reamplifying comprises a differential amplifier.

8. The electronic compensation reference circuit of claim 1 wherein said reference signal comprises a calibration voltage.

9. The process for providing a regulated light source and for processing the reflected light from joystick mirror to compensate for changes due to temperature, aging and reflectivity of mirrors and fiber optic path comprising the steps of:
   a) generating a regulated light source;
   b) directing and dividing said regulated light source into two light components as a function of the joystick position along an axis;

c) directing said two light components one each onto two photo diodes;

d) converting said two light components into proportional electrical signals;

e) amplifying said two electrical signals;

f) reamplifying the difference between said two amplified electrical signals for use as joystick position along an axis; also g) comparing the smaller of said two amplified electrical signals to a reference signal; and h) utilizing the output of said comparison to regulate said regulated light source.

10. The process for providing a regulated light source and for processing the reflected light from joystick mirror of claim 9 wherein said process is repeated for each of the two axis of the joystick positions.

11. The process for providing a regulated light source and for processing the reflected light from joystick mirror of claim 9 wherein said regulated light source includes signal for inverse proportional compensation due to temperature, aging, reflectivity of joystick mirror and fiber optic path.

12. The process for providing a regulated light source and for processing the reflected light from joystick mirror of claim 9 wherein said regulated light source comprises a light emitting diode.

13. The process for providing a regulated light source and for processing the reflected light from joystick mirror of claim 9 wherein said directing and dividing said regulated light source into said two light components as a function of the joystick position along an axis comprises a fibre optic path and a mirror.

14. The process for providing a regulated light source and for processing the reflected light from joystick mirror of claim 9 wherein each of said two photo diodes in said step for directing said two light components one each onto two photo diodes are in photoconductive mode.

15. The process for providing a regulated light source and for processing the reflected light from joystick mirror of claim 9 wherein reamplifying step comprises a differential amplifier.

16. The process for providing a regulated light source and for processing the reflected light from joystick mirror of claim 9 wherein said comparison to a reference signal comprises a calibration step.

17. An electronic compensation and reference circuit for generating an electrical signal proportional to the position of a joystick handle along an axis comprising:

a) a regulated light source;

b) fiber optic means for directing and dividing said regulated light source into two light components as a function of the joystick position along an axis;

c) fibre optic means for directing said two light components one each onto two photo diodes;

d) photdiode means for converting said two light components into proportional electrical signals;

e) amplifications means for amplifying said two electrical signals;

f) reamplification means for reamplifying the difference between said two amplified electrical signals for use as joystick position along an axis; and g) comparator means for comparing the smaller of said two amplified electrical signals to a reference signal.

18. The electronic compensation and reference circuit for generating an electrical signal proportional to the position of a joystick handle along an axis of claim 17 wherein said axis is a single axis.

19. The electronic compensation and reference circuit for generating an electrical signal proportional to the position of a joystick handle along an axis of claim 17 wherein second identical circuit is employed for processing movement of the joystick along a second axis.

20. The electronic compensation and reference circuit for generating an electrical signal proportional to the position of a joystick handle along an axis of claim 19 wherein a 3rd identical circuit is employed for processing movement of the joystick along a 3rd axis.

\* \* \* \* \*